May 20, 1969 — M. N. MURRAY — 3,445,089
VALVE ELEMENT WITH MOLDED RESILIENT TIP
Filed Dec. 8, 1965 — Sheet 1 of 2
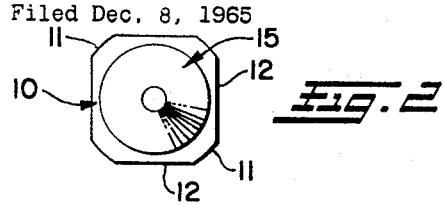
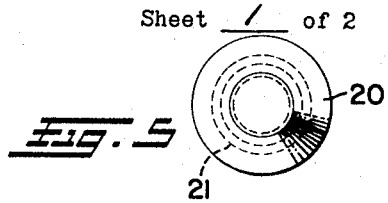
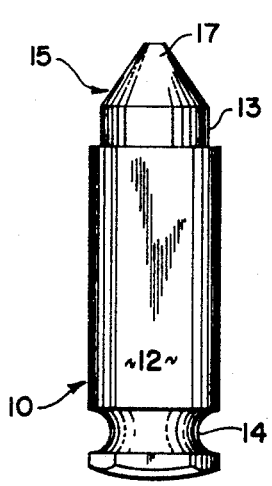
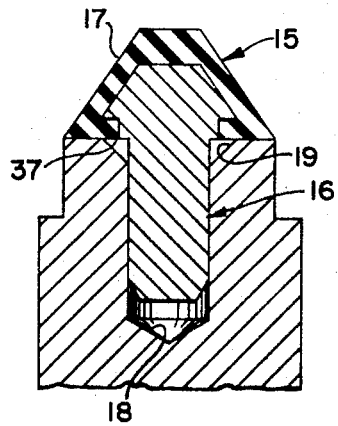
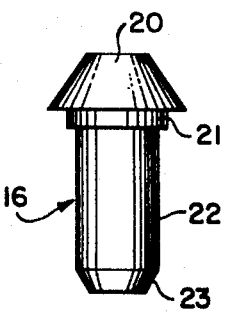
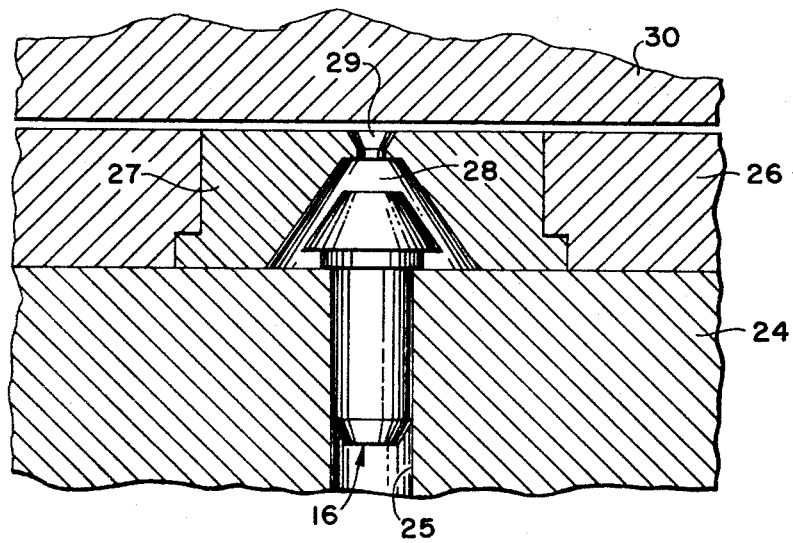
INVENTOR
MYLES N. MURRAY
BY Oberlin, Maky & Donnelly
ATTORNEYS May 20, 1969  M. N. MURRAY  3,445,089
VALVE ELEMENT WITH MOLDED RESILIENT TIP
Filed Dec. 8, 1965  Sheet 2 of 2
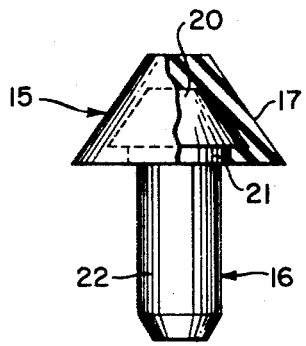
Fig. 7
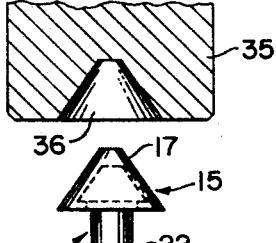
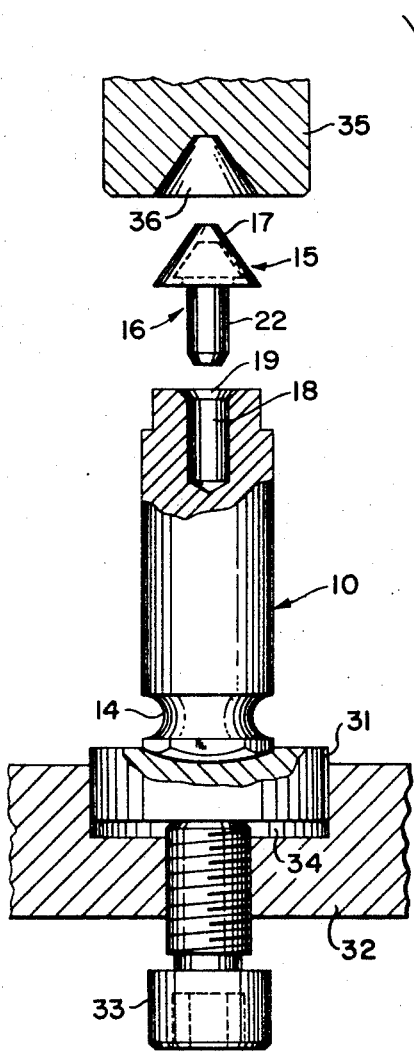
Fig. 8
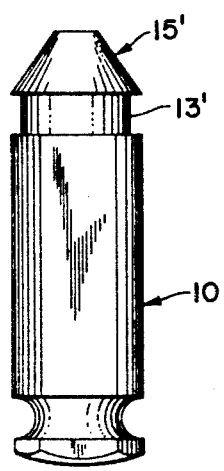
Fig. 9
INVENTOR
MYLES N. MURRAY
BY Oberlin, Maky & Donnelly
ATTORNEYS United States Patent Office 3,445,089
Patented May 20, 1969

3,445,089
VALVE ELEMENT WITH MOLDED RESILIENT TIP
Myles N. Murray, Chagrin Falls, Ohio, assignor to Industrial Electronic Rubber Company, Twinsburg, Ohio, a corporation of Ohio
Filed Dec. 8, 1965, Ser. No. 521,233
Int. Cl. F16k *1/38, 1/46*
U.S. Cl. 251—358    4 Claims

ABSTRACT OF THE DISCLOSURE

A valve element having an elongated body with an end socket and a metal pin with rubber molded about the head securely fitted in the body socket.

---

The present invention relates to valve elements of the type comprising a relatively rigid body and a tip of a resilient material applied thereto as the active sealing portion of the element. This invention is also concerned with a method for the manufacture of such a valve element.

The rubber tipped needle valve element now being used in fuel inlet valve assemblies of carburetors for internal combustion engines is a specific example of the indicated valve type and one with which the present improvements have been particularly concerned. Although a relatively recent introduction, this carburetor needle valve has become widely used and considerable attention is being given to possible improvement in the product itself, its performance characteristics, and techniques for its manufacture, especially suited for very high volume production. This invention is the result of such an effort and will be seen to provide improvement in all of the noted respects.

The invention thus provides a valve element comprising a relatively rigid body and a resilient tip of such improved mechanical design as to permit a wider choice of materials for its components. The present carburetor needle valve, for example, has a metal body and a tip anchored at one end which is made of a particular type of rubber which is relatively hard and expensive, the heat and fluid resistant fluoroelastomer supplied by E. I. du Pont de Nemours & Co. under the name "Viton" being the standard compound. This rubber has been used because of its resistance to swelling upon exposure to gasoline, although the hardness is somewhat greater than might be desired from the standpoint of ability to seal notwithstanding dirt or impurities forming irregularities on the sealing surfaces. The new valve design permits a utilization of softer rubber for enhanced sealing action; it is also possible with this design to employ materials other than metal for the body member, such as a suitable rigid plastic, which cannot be used in the conventional design.

The performance of such a valve element is influenced by the dimensional relationship of the tip to the body, with the noted carburetor inlet valve having a tip of conical shape and the critical relationship on this order being the concentricity of the tip with the body. The valve elements provided by this invention are improved in such regard and, in the more specific reference example, exhibit a much better average concentricity of tip and body than the conventional elements. The new valve element, moreover, is not susceptible to corking even with the noted employment of softer rubber for the tip, and it can be used in high pressure applications in which the common rubber tipped needle valve would be extremely likely to bind in the cooperable seat member.

The present manufacture of the rubber tipped carburetor needle valve and other valve elements of the same class involves the provision of a metal body in the end of which a socket, usually threaded, is formed, inserting this body in a suitable mold assembly defining a tip-forming cavity at such end of the body, and molding the rubber tip in the cavity against the body end and in the threaded socket to anchor the formed tip. The temperature and pressure conditions for rubber molding require that the body be made of metal in this procedure, and it will be appreciated that a solid rubber tip is produced. This process is limited also in that the size of the tip cannot exceed the diameter of the adjoining body end, and in the one operation there must be adequate controls to provide the desired concentricity of the tip and the body and also the finished overall length of the composite element. The present invention provides a substantial departure from this conventional procedure with the advantages of less rubber requirement, no practical limitation on the size of the tip resulting from the size of the body, reduced incidence of eccentricity of the tip relative to the body, and exact length control of the finished product. The new manufacturing process also provides greater capacity in a given mold assembly as compared to the usual practice, with consequent more efficient utilization of production equipment.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is an elevation of a carburetor needle valve in accordance with the present invention;

FIG. 2 is a top plan view of such valve;

FIG. 3 is a fragmented longitudinal section of the tip and the valve on an enlarged scale;

FIG. 4 is an elevation of a headed pin employed as a component of the new valve;

FIG. 5 is a top plan view of such pin;

FIG. 6 is a fragmented section of a mold assembly in which the headed pin is shown as an insert for molding rubber and the like about the head thereof;

FIG. 7 is an elevation of the pin having the rubber molded thereon, with a portion of the head in section;

FIG. 8 is a simplified and partly schematic illustration in section of a machine press employed for assembly of the tip formed by the pin and rubber with the body of the valve; and FIG. 9 is a further elevation of a valve element having a rubber tip of the same configuration but of larger size.

Referring now to the drawings in detail, the valve element illustrated in FIG. 1 is a carburetor float valve having an elongated metal body 10 the major extent of which is generally of square cross-section but with the corners 11 rounded as shown. The rounded corners 11 will engage the wall of the cylindrical fuel inlet passage of the carburetor, with the flat sides 12 and the passage wall defining segmental passages for the fuel flow. At one end, this body is provided with a short cylindrical extension or neck 13 of reduced diameter, while the other end in the illustrated embodiment is undercut at 14 to receive an attaching clip.

At the neck end, there is a rubber tip 15 of conical shape, the base of the tip being disposed against the end face of the neck 13. This tip, as shown in FIG. 3, is formed by a headed pin 16 about the head of which a body 17 of rubber is molded. The valve body 10 is provided with a socket 18 at this end of a length which is, for a purpose to be described, greater than the length or extent of the pin from the head to the other end. The socket is cylindrical over its major extent, with its axis coinciding with that of the body, but a conical enlargement 19 is provided at the outer end, also for a purpose to be set forth below.

The pin 16 is made of a suitable metal, such as aluminum, preferably in a cold heading opeartion and the head is, more particularly, formed to comprise a major part 20 in the form of a truncated cone and a minor or shoulder part 21 at the base of the conical part. The shoulder portion 21 is cylindrical and of noticeably lesser diameter than the major diameter of the conical part 20, while at the same time significantly larger than the diameter of the body proper 22 of the pin. The other end of the pin is preferably beveled as shown at 23 and, as earlier noted, the length of the pin body 22 from the head from the shoulder 21 is less than the depth of the socket 18 formed in the end of the valve body.

It will be evident from a comparison of FIGS. 3 and 4 that the main head portion 20 of the pin is of the same form as the finished molded rubber tip but of smaller size, with the body 17 of the rubber enclosing the head. The head of the pin thus serves as a rigid preform for the tip and not only provides an added degree of rigidity but takes the place of a substantial mass of the rubber which would be present in a solid rubber tip as in the conventional needle valve elements. It will also be seen that the rubber is effectively locked to the pin 16 by the inward continuation of the body behind the base of the main part 20 to the shoulder section 21.

It is preferred that the rubber be applied to the pin in molding apparatus having a multiplicity of cavities for high volume production, and FIG. 5 shows the character of such an assembly as to a single cavity, the others being identical. This assembly comprises a bottom plate 24 in which there is a hole 25 of a diameter fairly closely corresponding to that of the body 22 of the pin, so that the pin can be positioned in the plate in the manner illustrated. The shoulder 21 overlies to an appreciable extent the upper surface of the plate 24 about the opening 25 and, under the conditions of the rubber molding employed, the shoulder serves to seal this cavity forming surface of the plate against rubber intrusion therebeneath and consequent flash formation. There is a center plate 26 in the assembly having a hardened insert 27 in which there is formed a cavity 28 of the size and shape of the desired finished rubber tip, the axis of such cavity being in alignment with that of the pin receiving bottom plate opening 25. A sprue passage 29 provides communication from the top center of the cavity 28 to the upper face of the insert 27 which coincides with the top of the center plate 26. The assembly is completed by a top plate 30 shown as spaced slightly from the upper surface of the center plate 26 and, in accordance with known molding techniques, a sheet of the particular rubber composition on compound to be used is placed between the top and center plates and the assembly is subjected to pressure and heat sufficient to cause rubber from the sheet to be injected through the sprue passage 29 and fill the mold cavity 28 completely about the head of the pin 16.

The tip thus produced is shown in FIG. 7 and FIG. 8 illustrates the manner in which such component is the body 10 of the valve element. Again only a single work station is shown in this last figure and it will be understood that production equipment will be used capable of simultaneously effecting a multiplicity of operations. In this operation, the body 10 is suitably supported in a substantially vertical condition with its neck end uppermost and its other end preferably supported in a base block 31 which is vertically adjustable within a machine support plate 32. It will be noted that the block 31 illustrated has a slight concavity to provide correspondence with the somewhat convex end of the particular body element utilized, and the adjustment desired is shown as accomplished by a screw 33 threaded from the underside in the support plate 32 and extending into a socket 34 in which the base 31 is closely but vertically adjustably disposed. Cooperating with this body support assembly is a ram 35 having at its underside a recess 36 closely corresponding to the rubber tip of the pin and with its axis aligned with the axis of the valve element body 10 in the assembly. A pin 16 to which the rubber body has been molded is placed to be guided into the body socket 18, with the diameter of the latter being slightly smaller than the diameter of the pin body 22 to provide significant interference. The ram 35 is then lowered to engage the head of the pin in its recess 36, with this engagement assisting proper alignment of the pin, and the ram continues to descend with force applied suitable to drive the pin body 22 into the body 10 of the valve element. It will be readily appreciated that this operation can be performed in a standard punch press in which the ram 35 executes a definite stroke and bottoms at a fixed distance above the support plate 32 of the machine. Accordingly, the overall length of the needle valve can be very exactly controlled by proper base support of the valve body relative to the bottom position of the ram, and the adjustment provided as described permits this control to be realized with valves having different length specifications.

The bevel 23 at the end of the pin and the enlargement 19 in the end of the body socket 18 assist in guiding the initial placement and penetration of the former in the latter, and it will be seen from FIG. 3 that the end plane diameter of the enlargement 19 is slightly greater than the diameter of the head shoulder portion 21, whereby there is a definite clearance 37 between the two. This clearance is provided to assist in the noted length control of the valve, since it permits rubber to be distorted at this inner annular void in the event that a particular combination of pin and body tends to exceed the desired gauged length. In other words, a degree of more than usual compression of the rubber can be tolerated in this manner without causing such deformation of the outer surface of the body as to render it unsuitable for the intended use. It will also be noted from FIG. 3 in particular that, since the rubber tip is appreciably smaller than the main valve body, an assembly of mold plates of a given area can accommodate considerably more tips of the new pin form than valve bodies as in the conventional valve manufacture according to which such bodies must be positioned in the assembly to receive the direct application of the rubber to form the tips thereon. Moreover, the new valve utilizes two separately formed components in the pin and the body each of which will of course in quantity exhibit a variation of dimensions within specified tolerances, whereas the normal molding of the rubber tip to the metal body as heretofore practiced necessarily causes any eccentricity in the body always to appear in the tip. With the noted two formed parts, however, there is introduced for the first time the possibility of offsetting variations or slight deviations from the design dimensions and it can be shown that a better average is thus obtained.

It has been proposed for some applications that the rubber tip of such a needle valve be ground for still greater exactness, and the new tip is better suited for this operation if desired, since the preform rigidity provided by the pin makes the tip less susceptible to deformation under grinding pressure than the solid rubber tip. This added rigidity is also significant in use of the valve in a high pressure environment, such as in an air solenoid valve in which substantial pressure is exerted behind the needle tending to force the assembly into the cooperable seat. Where the tip is entirely of rubber, there is a very definite likelihood that the deformation would be such to bind forcibly the tip in the seat, a tendency which is much less likely if at all with the new tip of this invention.

A related advantage is the fact that a softer rubber than usually employed for the purpose can be satifactorily used in the new tip, including tips of valve elements which will be exposed to gasoline such as the carburetor inlet valves. An example of the rubber suitable for the purpose is Buna N elastomer, which is an inexpensive acrylonitrile-butadiene latex copolymer commercially available under the trade name "Hycar" of the B. F. Goodrich Company. The backing and reduction in rubber mass provided by the pin permit this use without danger of excessive swelling or corking, and the greater softness definitely assists in improved sealing by reason of accommodation to impurities on and irregularities in the sealing surfaces.

As shown in FIG. 9, the new valve element can also readily be utilized in a form in which the rubber tip 15' is of greater diameter than the end 13' of the valve body 10' to which it is attached. This of course results from the fact that the tip is formed independently of the body and subsequently united therewith, whereas in the standard needle the body must serve as a closure for the mold cavity and accordingly limits the size of the tip.

I, therefore, particularly point out and distinctly claim as my invention:

1. A resilient tip valve element, comprising an elongated element body having a socket in one end, and a separately formed composite tip secured to the element body at said one end, said tip including a metal pin having a head and a body extension of relatively reduced size, and resilient sealing material molded about the head of the pin, with the pin body extension projecting from the sealing material and secured in the socket of the element body to provide a valve element of a predetermined length.

2. A valve element as set forth in claim 1, wherein the element body is of rigid nonmetallic composition.

3. A valve element as set forth in claim 1, wherein the resilient sealing material overlies the end of the element body about the socket, and there is an interior annular void in the valve element about the pin body extension at the projection of the same from such socket to permit the resilient sealing material to be distorted in such void when said pin body extension is secured in the socket of the element body as aforesaid.

4. A valve element as set forth in claim 1, wherein the head of the metal pin is of a solid geometric form having significant axial extent, and the sealing material is of generally corresponding shape.

References Cited

UNITED STATES PATENTS

| | | | |
|---|---|---|---|
| 1,886,721 | 11/1932 | O'Brien. | |
| 2,194,961 | 3/1940 | Walker | 251—357 XR |
| 3,027,134 | 3/1962 | Nichols | 251—358 XR |
| 3,191,212 | 6/1965 | Heiss et al. | 16—42 |
| 3,326,520 | 6/1967 | Guenther | 251—358 |

FOREIGN PATENTS

| | | |
|---|---|---|
| 4,713 | 3/1915 | Great Britain. |

HENRY T. KLINKSIEK, *Primary Examiner.*